(12) United States Patent
La Rochelle

(10) Patent No.: US 8,336,229 B2
(45) Date of Patent: Dec. 25, 2012

(54) FOOTWEAR CONSTRUCTION

(76) Inventor: Simon La Rochelle, Granby (CA)

( * ) Notice: Subject to any disclaimer, the term of this patent is extended or adjusted under 35 U.S.C. 154(b) by 659 days.

(21) Appl. No.: 12/209,232

(22) Filed: Sep. 12, 2008

(65) Prior Publication Data

US 2009/0071035 A1    Mar. 19, 2009

Related U.S. Application Data

(60) Provisional application No. 60/972,884, filed on Sep. 17, 2007.

(51) Int. Cl.
*A43B 13/28*    (2006.01)
(52) U.S. Cl. .............. 36/12; 36/18; 12/142 C; 12/142 T
(58) Field of Classification Search ............... 36/14, 12, 36/17 R, 17 PW, 19.5, 22 R
See application file for complete search history.

(56) References Cited

U.S. PATENT DOCUMENTS

| D163,560 S | 6/1951 | Batchelder |
| 4,217,081 A | 8/1980 | Rooney |
| 4,236,327 A * | 12/1980 | Gorsche et al. ............... 36/14 |
| 6,637,131 B2 | 10/2003 | Lee et al. |
| 6,763,609 B2 | 7/2004 | Su et al. |
| 6,978,557 B2 * | 12/2005 | Lee ............................ 36/19.5 |
| 2004/0143995 A1 * | 7/2004 | McClelland ................ 36/30 R |

FOREIGN PATENT DOCUMENTS

CA    2476157    1/2005

OTHER PUBLICATIONS

International Search Report, PCT/IB2008/053773, Apr. 2, 2009.

* cited by examiner

*Primary Examiner* — Ted Kavanaugh
(74) *Attorney, Agent, or Firm* — Norton Rose Canada LLP

(57) ABSTRACT

A footwear item comprises an upper adapted to receive a foot of a wearer. A midsole is molded directly to the upper and defines a shoulder about the upper. The midsole is adapted to be connected to an outsole and comprises a stitch line on the shoulder of the midsole. A method for assembling the item of footwear is also provided.

5 Claims, 5 Drawing Sheets

FOOTWEAR CONSTRUCTION

CROSS-REFERENCE TO RELATED APPLICATION

This patent application claims priority on U.S. Provisional Patent Application No. 60/972,884, filed on Sep. 17, 2007.

FIELD OF THE APPLICATION

The present patent application relates to the construction of footwear and, more particularly, to a method of assembly of a work boot sole to upper.

BACKGROUND OF THE ART

From U.S. Pat. No. 6,763,609, issued to Su on Jul. 20, 2004: "Conventional footwear construction has generally followed two methods, welted construction and molded construction. Welted construction generally stitches an outer sole to an upper to form footwear and thus is labor intensive and therefore expensive. Molded construction generally uses molds and liquid sole material to form the sole onto an upper. This is a less expensive alternative that results in a very durable and flexible outer sole, however the bond between the outer sole and the upper may not be as durable as welted attachment."

The assembly of sole to upper known as "Goodyear welt" is well documented in the footwear industry. A welt is a strip of leather, rubber, or plastic that is stitched to the upper and insole of a shoe, as an attach point for the sole. The space enclosed by the welt is then filled with cork or some other filler material, usually either porous or perforated, for breathability. The outsole is both cemented and stitched to the welt.

The Goodyear welt involves a method of attaching the sole of a shoe to the upper. According to the method, the upper is drawn over the last and held temporarily whilst the welt is stitched to the upper and inner sole. The sole is hand-stitched through the welt to complete the process. This construction allows multiple sole replacements, extending the life of the footwear.

The welt generally includes a horizontal base from which upward and downward ribs extend. The upwardly extending rib is stitched to the upper and the downwardly extending rib or the base is stitched to the sole to hold the upper and outsole together. The welt itself is semi-rigid or hard to withstand the forces exerted through the stitching. In the finished shoe, the welt provides an aesthetically pleasing transition between the sole and upper.

Goodyear welt constructed work boots are known to be very strong and durable. This kind of construction is a synonym of toughness in the mind of wearers because of the durability of the assembly of sole to upper. Goodyear welt construction is a shoemaking process that has proven itself to be long-lasting under heavy conditions. This is why the particular and distinctive stitching of the Goodyear welt, bonding together the welt and sole, has represented, for years, durability and toughness. The Goodyear welt stitching has become, with time, a proof of quality and good craftsmanship in the business of work and safety footwear.

Although the welt construction is durable and aesthetically pleasing, the welt and associated stitching compromises the flexibility and waterproof properties of the shoe. This is true in welt constructions where the sole is a hollow shell filled with a flexible polyurethane-foam material. Furthermore, the inclusion of the welt in welt construction footwear increases the cost of and the time required in manufacturing such footwear.

The cost and complexity of manufacturing Goodyear welt boots influence the search for a more efficient shoe-making process, following the popular industrial injection molding process. The assembly of sole to upper called "injection" is also called "direct-attach" construction because it does not require a welt of upper to sole or gluing. In this process, the sole is directly attached to upper by molding it in a mold at high temperature.

Consequently, injected footwear is quite flexible and thus comfortable when compared to other types of constructions. Moreover, injection of soles ensures a strong fiber bonding and seal between sole and upper. This makes waterproofing of footwear much easier to achieve. Injection is an efficient and cost-effective process that contributes to keeping the price of footwear relatively low.

More particularly, injection of midsoles with a low-density polymer gives the boot a soft cushioning, keeping a good memory of shape. Injected midsoles are, thus, more comfortable over a long period of time. In recent years, double-injected work boots have become very popular because of their lightness, flexibility, comfort and all the benefits associated with the quality of bonding (waterproof benefit, for example). However, for many reasons (e.g., because of their plastic-type look, because of the absence of a Goodyear stitch line), injected work boots do not have an image of durability and toughness.

In order to simulate the look of the Goodyear welt on shoes and boots, soles have been molded with a stitch line pattern (also molded). However, from a close stand point, it is clear that the stitch line is molded. In another embodiment, a stitch line is typically added to a molded sole, with the sole and stitch line assembly being subsequently glued to the upper. One of the issues with such a boot/shoe construction is that it may allow water infiltration between the upper and the sole. Moreover, the bonding of the molded sole with the upper is not as strong as with a direct-attach construction.

SUMMARY OF THE APPLICATION

It is therefore an aim of the present disclosure to provide a novel footwear construction that addresses issues associated with the prior art.

It is a further aim of the present disclosure to provide a novel method for assembling footwear items that addresses issues associated with the prior art.

Therefore, in accordance with the present application, there is provided a footwear item comprising an upper adapted to receive a foot of a wearer; a midsole molded directly to the upper and defining a shoulder about the upper, the midsole adapted to be connected to an outsole; and a stitch line on the shoulder of the midsole.

Further in accordance with the present application, there is provided a method for assembling an item of footwear, comprising: providing an upper; molding a midsole directly to the upper, so as to define a shoulder about the upper; and performing a stitch line solely on the shoulder of the midsole.

DESCRIPTION OF THE PREFERRED EMBODIMENTS

Figure 1:
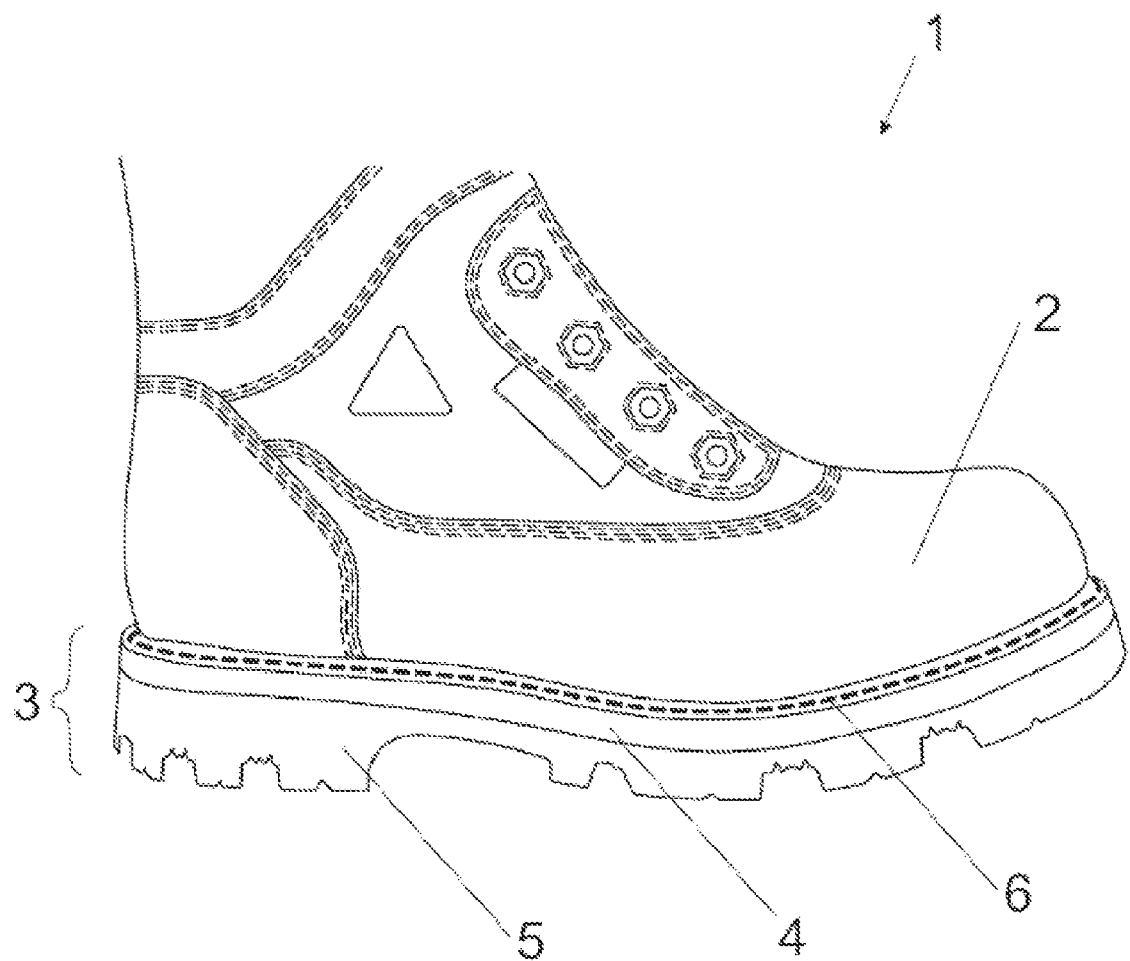
FIG. 1 is a perspective view of a footwear item constructed in accordance with the present disclosure.

Referring now to the drawings and more particularly to FIG. 1, a footwear item constructed in accordance with the present application is generally shown at 1. The footwear item 1 is illustrated as being a work boot, but could also be any other type of suitable footwear, such as a shoe. The footwear item 1 has two main parts: an upper 2 and a sole 3.

The sole 3 is made of two different layers: the midsole 4 is connected to the upper 2, while the outsole 5 is the interface of the footwear item 1 with the ground. The midsole 4 has a shape similar to that of a Goodyear-welt inner board, and defines a peripheral shoulder about the bottom of the upper 2. As the midsole 4 is made by an injection process and is between the foot of the wearer and the ground, it contributes to the comfort, the flexibility and waterproofness of the item 1. The outsole 5 is bonded or molded to the midsole 4 and is in contact with the ground to offer a tear and slip resistance. A Goodyear-welt type of sole stitching thread line is provided on the periphery of the midsole 4 and is illustrated at 6.

Now referring to FIGS. 2-6, the different steps of a method of assembly in accordance with a first embodiment are described.

Figure 2:
FIG. 2 is a schematic view of an upper of the footwear item of FIG. 1.

In FIG. 2, the upper 2 is shown before the lasting on an injection machine, and is therefore without the midsole 4 (FIG. 1).

Figure 3:
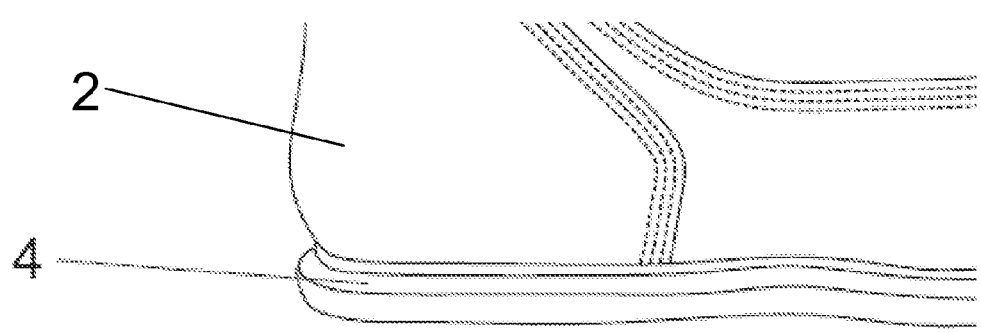
FIG. 3 is a schematic view of the upper of the footwear item of FIG. 2, with a midsole molded thereto in accordance with a first embodiment.

As is shown in FIG. 3, the upper 2 is then lasted on the injection machine where the midsole 4, having a shape similar to a Goodyear welt inner board, is molded onto the upper 2. The midsole 4 is therefore made from a polymeric material (e.g., polyurethane) that can be injected in a molding process.

Figure 4:
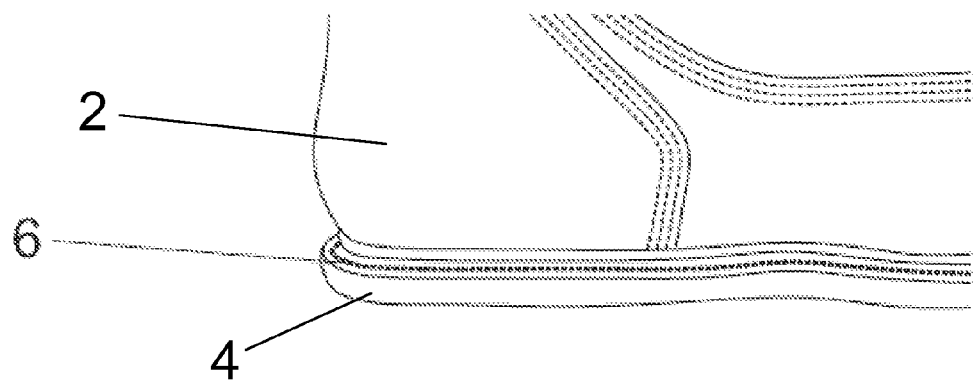
FIG. 4 is a schematic view of the upper and midsole of FIG. 3, with a stitch on the midsole.

As is shown in FIG. 4, the upper 2 with the midsole 4 molded directly thereto is sent to the stitching machine (e.g., a Goodyear-welt stitching machine) to add the renowned Goodyear-welt thread line 6 all around the shoulder of the midsole 4.

Therefore, at this point, the footwear item 1 has the upper 2, and the midsole 4 molded directly to the upper 2 according to an injection process. The stitch line 6 is provided on the midsole 4.

Figure 5:
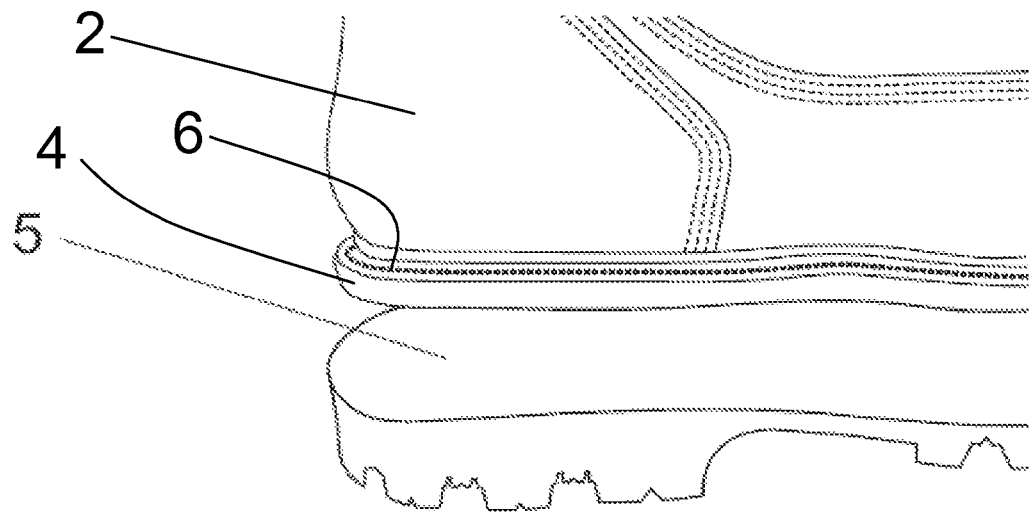
FIG. 5 is a schematic view of the upper and stitched midsole of FIG. 4, with an outsole aligned with the midsole for subsequent assembly.
Figure 6:
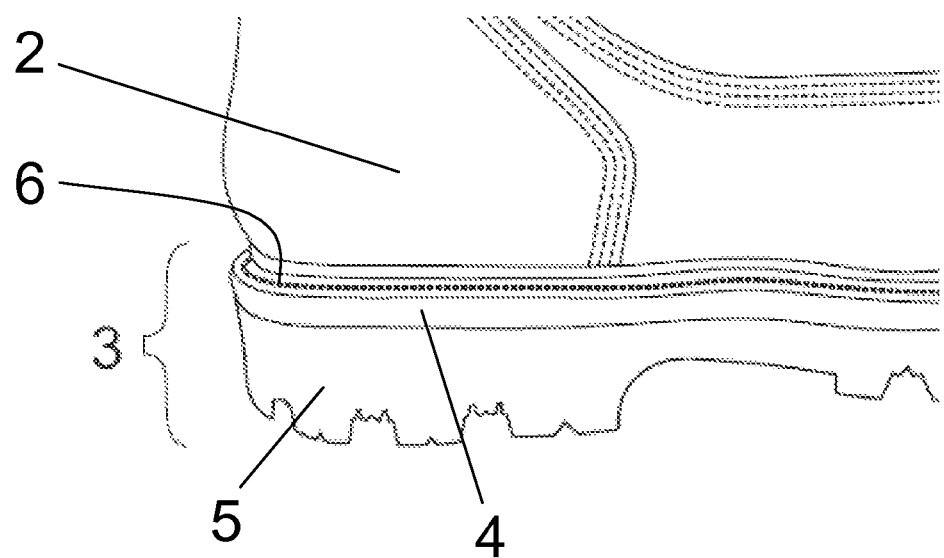
FIG. 6 is a schematic view of the footwear item of FIG. 5, with the outsole bonded to the midsole.

Referring to FIGS. 5 and 6, the resulting product, namely the upper 2 with the stitched midsole 4, is then sent to the cementing line for the assembly of the outsole 5. FIG. 5 shows the upper 2 and midsole 4 combination before the cementing of the outsole 5. It is pointed out that the outsole 5 may be molded to the stitched midsole 4 as an alternative to cementing. Moreover, additional layers may be added between the midsole 4 and the outsole 5, for instance for esthetic purposes. FIG. 6 shows the final product after the cementing process, where the outsole 5 is connected to the molded midsole 4. An optional finishing process may be performed if required after cementing, to trim or clean off excess glue, or to smoothen the junction between the midsole 4 and the outsole 5.

The result of this sequence of steps (injection molding, welt-like stitching and cementing) is a hybrid direct-attached constructed work boot that combines the aesthetic of Goodyear welt footwear with the benefits (lightness, flexibility, waterproofness, ease of manufacture, etc.) of injected footwear.

Figure 7:
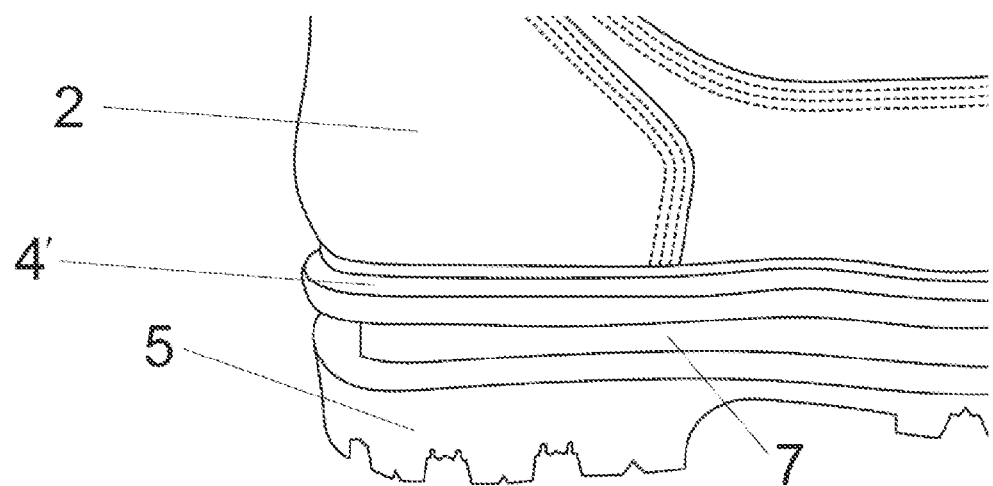
FIG. 7 is a schematic view of the upper of the footwear item of FIG. 2, with an upper portion of the midsole and outsole molded thereto in accordance with a second embodiment.
Figure 8:
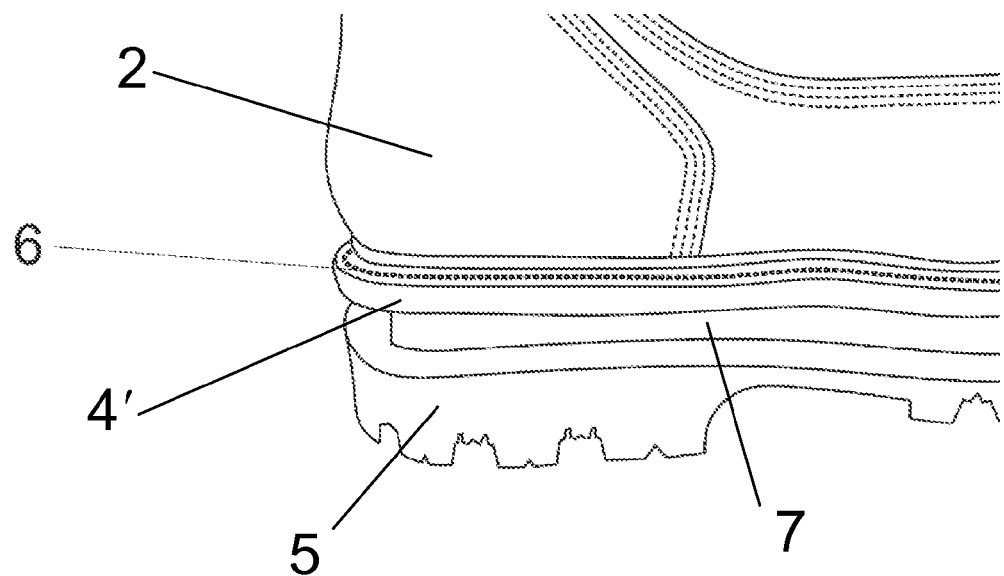
FIG. 8 is a schematic view of the upper, upper portion of the midsole and outsole of FIG. 7, with a stitch on the midsole.
Figure 9:
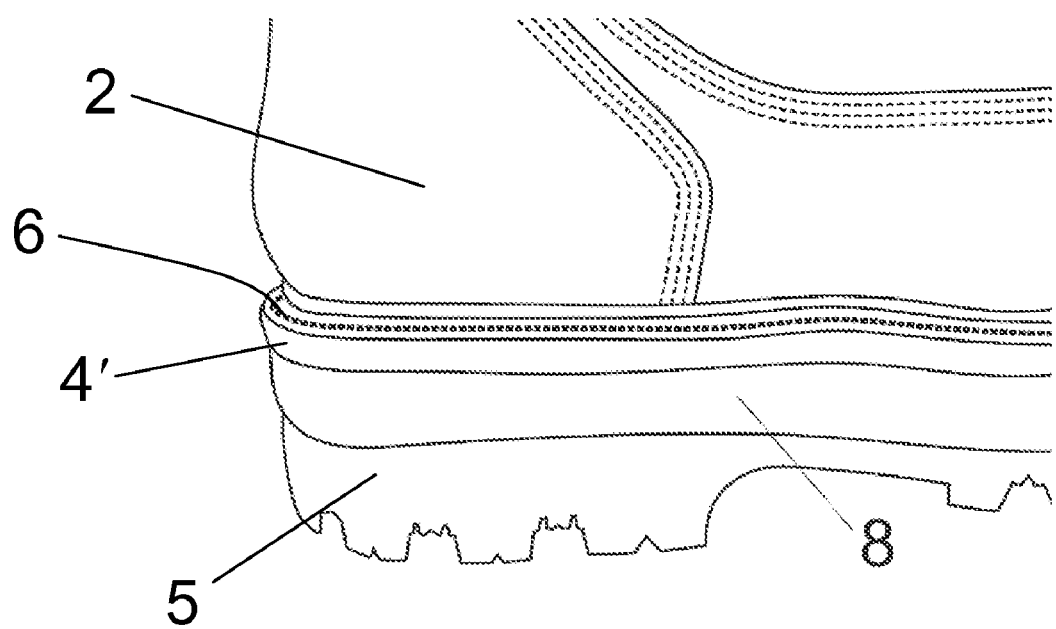
FIG. 9 is a schematic view of the footwear item of FIG. 8, with a lower portion of the midsole molded between the upper midsole and the outsole.

Now referring to FIGS. 7-9, the different steps of a method of assembly in accordance with a second embodiment are described.

As is shown in FIG. 7, the upper 2 is lasted on the injection machine where an upper portion 4' of the midsole, having a shape similar to a Goodyear welt inner board, is molded onto the upper 2, along with the outsole 5. As an alternative, the outsole 5 may be a pre-molded outsole, that is inserted into the mold prior to the injection cycle. The injection material then interconnects the pre-molded outsole to the upper 2 while forming the upper portion 4' of the midsole. The injection process for this step is therefore referred to as direct-attach. The upper portion 4' of the midsole and the outsole 5 are therefore made from materials that can be bonded to one another during a molding process (e.g., polyurethane or rubber). The upper portion 4' of the midsole and the outsole 5 may therefore be made from different materials.

The upper portion 4' of the midsole and the outsole 5 are interconnected by a web of the polymeric material, resulting in a peripheral channel 7 therebetween.

As is shown in FIG. 8, the upper 2 with the upper portion 4' of the midsole and the outsole 5 molded directly thereto is sent to the stitching machine (e.g., a Goodyear-welt stitching machine) to add the renowned Goodyear-welt thread line 6 all around the shoulder of the upper portion 4' of the midsole. The peripheral channel 7 enables the stitching machine to reach an underside of the welt.

Therefore, at this point, the footwear item 1 has the upper 2, and the midsole 4' molded directly to the upper 2 according to an injection process. The stitch line 6 is provided on the midsole 4'.

Referring to FIG. 8, the resulting product, namely the upper 2 with the stitched upper portion 4' of midsole and outsole 5, is then returned to the injection machine for the peripheral channel 7 to be filled. FIG. 9 shows the upper 2, the upper portion 4' of the midsole and the outsole 5 combination after the lower portion 8 of the midsole has been injected in the peripheral channel 7 (FIG. 8). To obtain a finished look for the item of footwear, finishing steps may be performed, such as trimming and cleaning.

Therefore, the present application presents a hybrid method of assembly of footwear that combines the benefits of injection-molded footwear to the "tough" look of Goodyear welt footwear. The product resulting from the method of assembly of the present application features Goodyear-welt stitching on an injected midsole, while keeping the properties related to injected footwear. By imitating the Goodyear welt construction, the product resulting from the method of assembly of the present application offers the aesthetics of Goodyear-welt footwear in a direct-attach method of assembly.

The invention claimed is:
1. A footwear item comprising:
an upper adapted to receive a foot of a wearer;

a midsole molded directly to the upper and defining a shoulder about the upper, the midsole adapted to be connected to an outsole;

stitching on the shoulder of the midsole, the stitching having a thread line surrounding the upper on the shoulder and extending from an undersurface of the midsole to a top of the midsole; and an outsole connected directly to the undersurface of the midsole, the outsole not featuring any thread on an undersurface thereof.

2. The footwear item according to claim 1, further comprising the outsole directly attached to an undersurface of the midsole by injection molding.

3. The footwear item according to claim 1, further comprising the outsole joined to the midsole by a web molded between the outsole and the midsole, a peripheral channel being defined about the web between the midsole and outsole.

4. The footwear item according to claim 3, further comprising a lower portion of the midsole filling the peripheral channel so as to define a generally planar surface on the periphery of the sole of the footwear item.

5. The footwear item according to claim 3, wherein the outsole is a pre-molded outsole.

* * * * *